(12) United States Patent
Koizumi

(10) Patent No.: US 7,822,991 B2
(45) Date of Patent: *Oct. 26, 2010

(54) DIGITAL COMBINED APPARATUS, CONTROL METHOD THEREFOR, AND DIGITAL COMBINED APPARATUS SYSTEM

(75) Inventor: Shinji Koizumi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 269 days.

This patent is subject to a terminal disclaimer.

(21) Appl. No.: 11/979,031

(22) Filed: Oct. 30, 2007

(65) Prior Publication Data

US 2008/0083028 A1 Apr. 3, 2008

Related U.S. Application Data

(63) Continuation of application No. 10/359,562, filed on Feb. 7, 2003, now Pat. No. 7,302,580.

(51) Int. Cl.
*G06F 21/00* (2006.01)

(52) U.S. Cl. .................... 713/183; 713/185; 726/2; 726/7; 726/27; 380/201; 380/230; 380/229; 380/234; 358/1.1; 358/1.13

(58) Field of Classification Search .......... 713/168, 713/182, 186, 155, 156, 183, 185; 726/2, 726/4, 18, 28, 29, 7, 27; 380/277, 278, 279, 380/282, 201, 230, 229, 234; 705/50; 282/115; 345/156; 358/1.1, 1.13

See application file for complete search history.

(56) References Cited

U.S. PATENT DOCUMENTS

| | | | | |
|---|---|---|---|---|
| 5,210,571 | A * | 5/1993 | Peloquin et al. | 399/11 |
| 5,715,487 | A * | 2/1998 | McIntyre et al. | 396/299 |
| 5,877,746 | A * | 3/1999 | Parks et al. | 345/156 |
| 6,597,469 | B1 * | 7/2003 | Kuroyanagi | 358/1.15 |
| 6,973,597 | B2 * | 12/2005 | Schroath et al. | 714/44 |
| 7,089,209 | B1 * | 8/2006 | Kolls | 705/39 |
| 7,177,034 | B2 * | 2/2007 | Nakagawa et al. | 358/1.14 |
| 2002/0083114 | A1 * | 6/2002 | Mazzagatte et al. | 709/100 |
| 2003/0145218 | A1 * | 7/2003 | Hutchison | 713/200 |
| 2003/0179399 | A1 * | 9/2003 | Matsunoshita | 358/1.13 |

FOREIGN PATENT DOCUMENTS

| | | | |
|---|---|---|---|
| GB | 2 302 433 A | | 1/1997 |
| GB | 2302433 | * | 1/1997 |
| JP | 11-045034 | * | 7/1997 |
| JP | 11-045034 A | | 2/1999 |
| JP | 11-175225 A | | 7/1999 |
| JP | 11-175225 | * | 2/2009 |

* cited by examiner

*Primary Examiner*—Kambiz Zand
*Assistant Examiner*—Tongoc Tran
(74) *Attorney, Agent, or Firm*—Foley & Lardner LLP

(57) ABSTRACT

This invention relates to a digital combined apparatus including an operation panel, a reader/writer which writes/reads data on/from a recording medium, and a controller which controls the operations of the operation panel and reader/writer. When the reader/writer reads out ID information of the user from the recording medium on which at least the ID information is recorded, the operation panel displays a user authentication window which prompts the user to input a password for identifying himself or herself.

17 Claims, 4 Drawing Sheets

DIGITAL COMBINED APPARATUS, CONTROL METHOD THEREFOR, AND DIGITAL COMBINED APPARATUS SYSTEM

The present application is a continuation of U.S. application Ser. No. 10/359,562, filed Feb. 7, 2003, now U.S. Pat. No. 7,302,580, the entire contents of which is incorporated herein by reference.

BACKGROUND OF THE INVENTION

A technique of operating a conventional copying machine or the like is disclosed in, e.g., Japanese Patent Laid-Open No. 11-175225.

A copying machine disclosed in this reference reads an IC card or magnetic card which holds ID information representing a user. The digital combined apparatus can identify the user and allows the user to use it. This copying machine performs charging management for each user on the basis of the read ID information.

A user registers address information such as an E-mail address or FAX number in the copying machine, and another user can use the address information.

The conventional copying machine suffers the following problems.

(1) When address information is saved not in the copying machine but in the IC card or magnetic card of the user, another user cannot use the address information and has to input the same address information to the copying machine.

(2) When address information is saved in the copying machine, the address information may be used by another user who should not use it, violating the privacy.

(3) If an IC card or magnetic card is stolen, an "unauthorized" user may use the copying machine to charge the authentic user.

(4) When the user wants to transfer a file in a user's client personal computer (to be referred to as a client PC hereinafter) to the copying machine and print out the file outside his/her home, he/she cannot easily refer to an address book registered in the copying machine on the client PC. Even if the user can use the address book, the address book may be known by a third person, resulting in poor security.

SUMMARY OF THE INVENTION

It is an object of the present invention to provide a digital combined apparatus (MFP; Multi-Function Printer) capable of solving the above-described processing problems and security problems, a control method therefor, and a digital combined apparatus system.

A digital combined apparatus according to the present invention comprises an operation panel, a reader/writer which writes/reads data on/from a recording medium, and a controller which controls operations of the operation panel and the reader/writer, wherein when the reader/writer reads out ID information of a user from the recording medium on which at least the ID information is recorded, the operation panel displays a user authentication window which prompts the user to input a password for identifying the user.

It is also possible that the digital combined apparatus further comprises a memory which stores data, and that the operation panel displays the user authentication window, the controller collates a password input on the operation panel in accordance with the user authentication window with an authentic password saved in the memory in advance, and if the input password is determined to be authentic, the digital combined apparatus can be operated.

A digital combined apparatus system according to the present invention comprises at least one digital combined apparatus, and a server which is connected to the digital combined apparatus via a network and has a memory, wherein the server collates a password input on an operation panel with an authentic password stored in the memory, and upon determining that the input password is authentic, outputs an instruction to a controller so as to allow operating the digital combined apparatus.

When the server determines that the input password is authentic, a user having the password can be billed for a subsequent job performed by the digital combined apparatus.

It is also possible that address information representing a transmission destination, and available/unavailable information representing whether another user can use the address information are input on the operation panel, the memory stores the address information and the available/unavailable information, and the controller permits or inhibits use of the address information by another user in accordance with the available/unavailable information.

It is also possible that the digital combined apparatus system comprises at least two digital combined apparatuses, address information representing a transmission destination input on the operation panel of one digital combined apparatus is saved in the memory of the server, and the address information can be used in the other digital combined apparatus connected via the network.

It is also possible that the digital combined apparatus system further comprises a client PC connected to the network, and when the server determines that the password input on the operation panel of the digital combined apparatus is authentic, address information saved in the client PC of a user is loaded into the digital combined apparatus and can be used in the digital combined apparatus.

It is also possible that the digital combined apparatus system further comprises a client PC connected to the network, and when the server determines that the password input on the operation panel of the digital combined apparatus is authentic, a data file saved in the client PC of a user is loaded into the digital combined apparatus and can be used in the digital combined apparatus.

According to the present invention, a method of controlling a digital combined apparatus having an operation panel, a reader/writer which writes/reads data on/from a recording medium, and a controller which controls operations of the operation panel and the reader/writer, comprises the steps of causing the reader/writer to read out ID information of a user from the recording medium on which at least the ID information is recorded, and causing the operation panel to display a user authentication window which prompts the user to input a password for identifying the user.

DESCRIPTION OF THE PREFERRED EMBODIMENT

A preferred embodiment of the present invention will be described in detail below with reference to the accompanying drawings.

Figure 1:
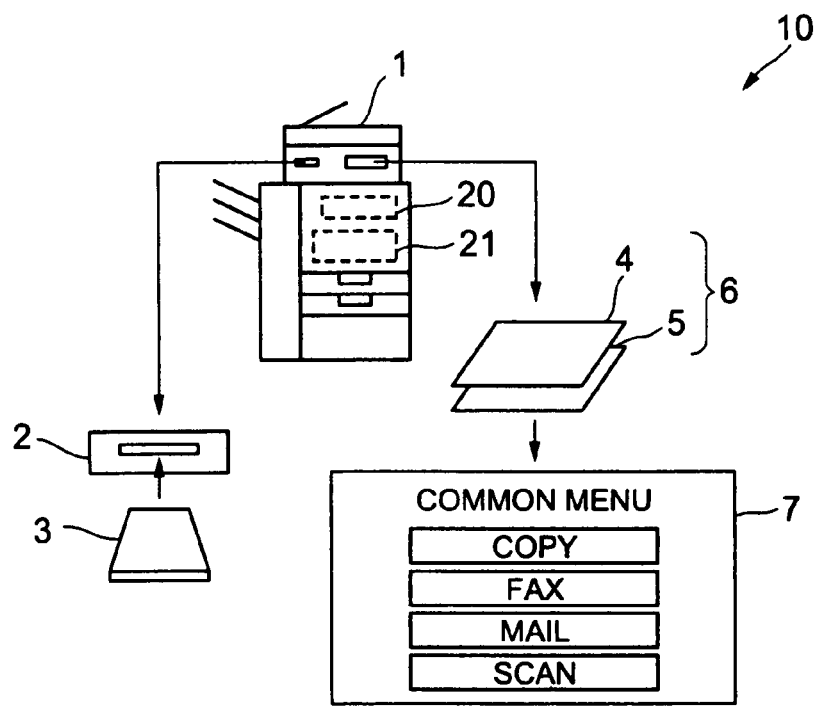
FIG. 1 is an explanatory view showing the schematic arrangement of a digital combined apparatus according to an embodiment of the present invention.

FIG. 1 shows the schematic arrangement of a digital combined apparatus 10 according to the embodiment. The digital combined apparatus 10 comprises a digital combined apparatus main body 1 having a controller 20, a memory 21, and an operation panel 6 including a touch panel 4 and LCD panel 5 serving as a means for setting various functions and operation contents by the user; and a reader/writer 2 which writes data on a recording medium 3 such as an IC card, magnetic card, memory card, barcode-printed card, or wireless unit and reads recorded data.

The controller 20 controls the operations of the digital combined apparatus main body 1 and reader/writer 2. The memory 21 saves various data such as user ID information and address information to be described later. The reader/writer 2 has a connector for electrically connecting an IC card, magnetic card, and memory card, a means for inserting and reading a barcode-printed card, and a means for transmitting/receiving data to/from a wireless unit in a noncontact state.

Figure 2:
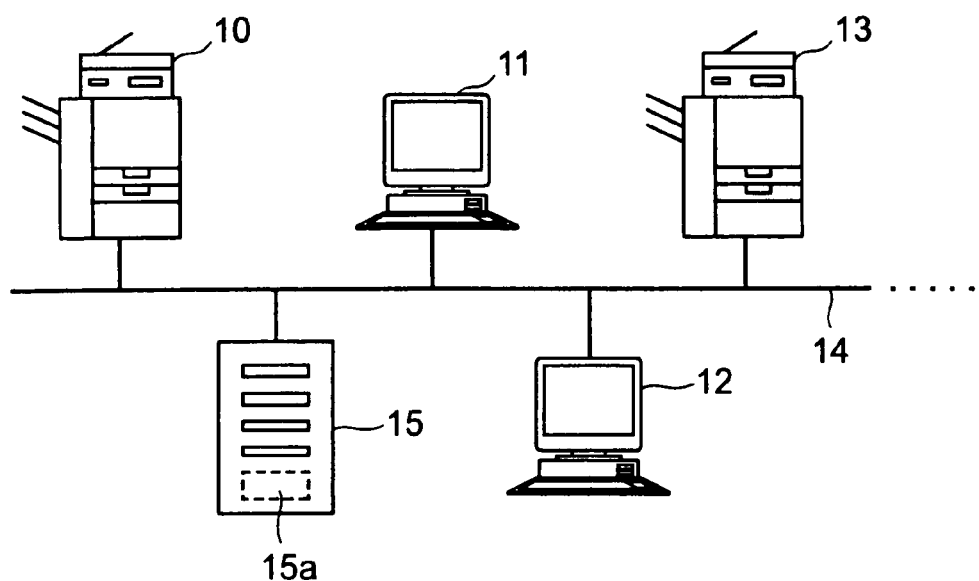
FIG. 2 is an explanatory view showing the configuration of a system in which the digital combined apparatus is connected to a client PC via a network.

The digital combined apparatus may be used singly or as a system constructed by connecting via a network 14 at least one digital combined apparatus 10 and a plurality of user's client PCs 11, 12, ..., as shown in FIG. 2.

In some cases, two or more digital combined apparatuses 10, 13, ... may be connected via the network 14 to construct a system.

Data necessary to operate the digital combined apparatuses 10, 13, ... may be managed by the digital combined apparatuses 10, 13, ... or integrally managed by a server 15 which is connected to the network 14 and has a memory 15a.

Figure 3:
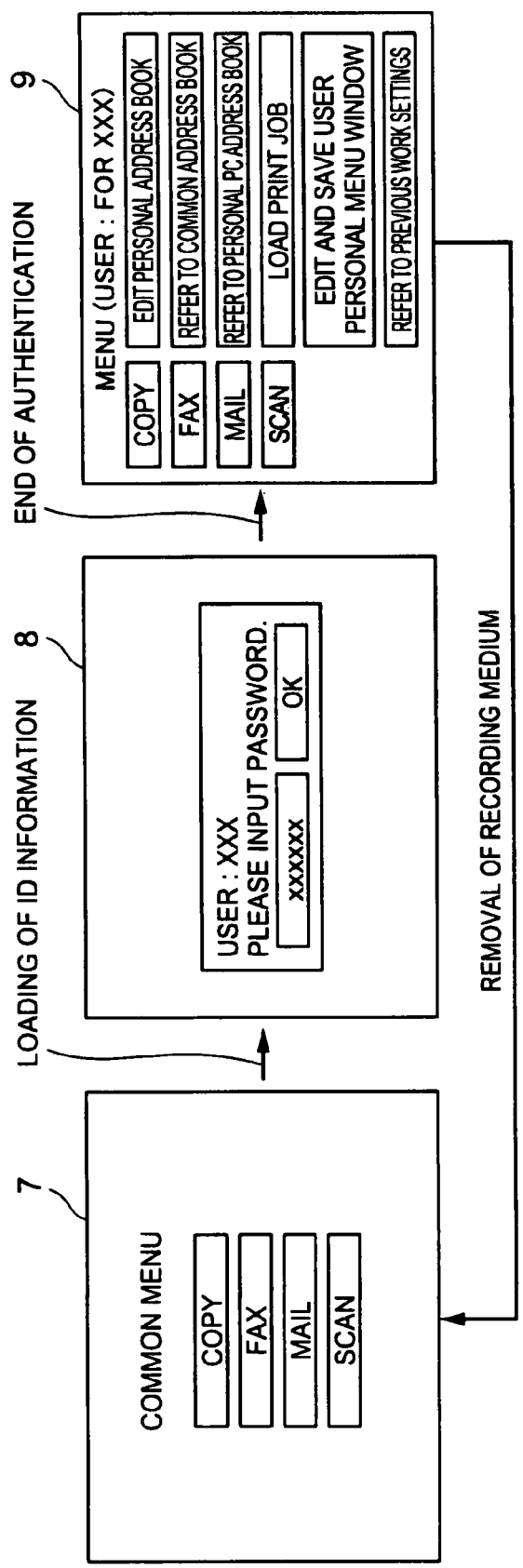
FIG. 3 is an explanatory view showing a window display in the digital combined apparatus.
Figure 4:
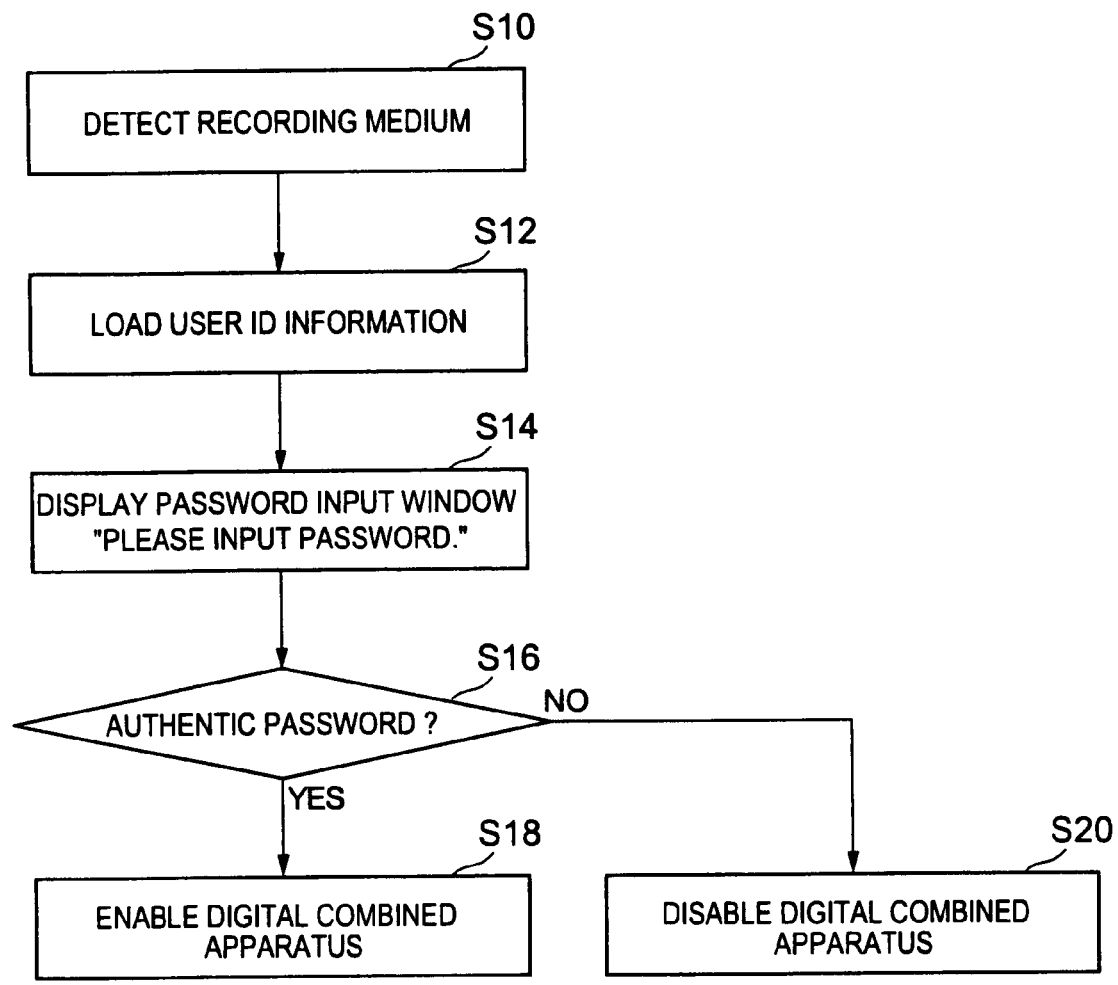
FIG. 4 is a flow chart showing an operation sequence in the digital combined apparatus.

The operation contents of the digital combined apparatus 10 controlled by the controller 20 will be explained with reference to FIG. 3 showing the transition of the image display and FIG. 4 showing operation contents as a flow chart.

In an initial state, the window display on the operation panel 6 of the digital combined apparatus 10 provides menu buttons for selecting any one of, e.g., "copy", "FAX", "mail", and "scan", as shown as a common menu window 7 in FIG. 3.

In this state, in step S10, the reader/writer 2 detects the recording medium 3 of each user.

In step S12, the reader/writer 2 reads ID information which is written on the recording medium 3 and identifies the user.

In step S14, read of ID information triggers transition of the window display on the operation panel 6 from the common menu window 7 to a user authentication window 8 which prompts the user to input a password, as shown in FIG. 2. The user authentication window 8 corresponds to a password input popup window, and the user inputs a password set in advance.

In step S16, the controller 20 collates the input password with an authentic password saved in the memory 21 within the digital combined apparatus main body 1.

If YES in step S16, the controller 20 allows the use of the digital combined apparatus 10 in step S18, and displays a user personal menu window 9 customized for each user on the operation panel 6. The user personal menu window 9 is customized on the basis of the past operation log of each user.

The user personal menu window 9 provides menu buttons for selecting general processes such as "copy", "FAX", "mail", and "scan", and menu buttons for selecting user processes such as "edit a personal address book", "refer to a common address book", "refer to a personal PC address book", "load a print job", "edit and save a user personal menu window", and "refer to previous work settings".

Information for displaying the user authentication window 8 and user personal menu window 9 is loaded from the memory 21 in the digital combined apparatus main body 1 in the use of the single digital combined apparatus 10. When the digital combined apparatus 10 is used as a network-connected system, the information may be loaded from the memory 21 within the main body 1 of the digital combined apparatus 10 or from the memory 15a in the server 15 connected to the network 14.

If the user selects "edit a personal address book", he/she can input, save, or delete the personal address book in the window.

If the user selects "refer to a common address book", he/she can select whether or not to disclose the personal address book to the common address book. If the personal address book is disclosed to the common address book, the user inputs address information to be disclosed and available information. If the personal address book is not disclosed, the user inputs undisclosed address information and unavailable information. The controller 20 performs processing of adding or not adding the address to the common address book in accordance with the available or unavailable information.

If the user selects "refer to a personal PC address book", he/she can refer to an address book in the client PC of the user.

If the user selects "load a print job", he/she can load data on a print job set in advance.

If the user selects "edit and save a user personal menu window", he/she can edit or save his/her menu window.

If the user selects "refer to previous work settings", he/she can read out and refer to previous work settings.

The user is billed for various jobs executed by the user after the password is authenticated.

If the recording medium 3 is removed from the reader/writer 2, the window displays returns from the user personal menu window 9 to the common menu window 7.

If NO in step S16, the controller 20 inhibits the use of the digital combined apparatus 10 in step S20.

Data on the above-mentioned personal address book, common address book, personal PC address book, print job, user personal menu window editing results, and previous work settings are saved in the memory 21 within the digital combined apparatus main body 1, or saved and integrally managed in the memory 15a of the server 15 connected via the network 14 to the digital combined apparatuses 10, 13.

When these data are integrally managed by the server 15, addresses saved in the common address book can be commonly used in a plurality of digital combined apparatuses 10, 13, . . . . connected via the network 14.

Figure 5:
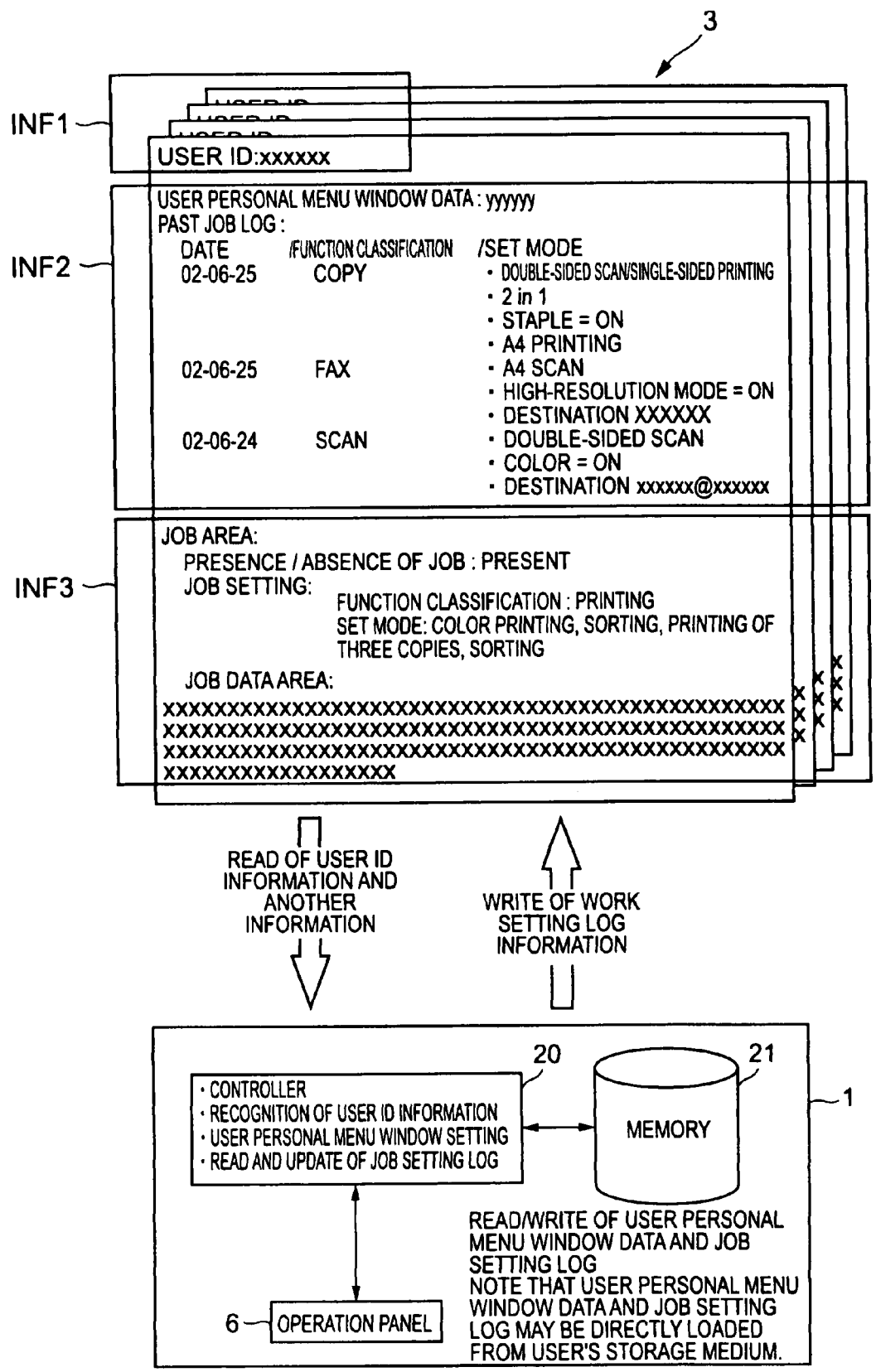
FIG. 5 is an explanatory view showing information contents exchanged between the digital combined apparatus and a recording medium.

FIG. 5 shows information contents exchanged between the digital combined apparatus main body 1 and the recording medium 3.

The recording medium 3 of each user must hold at least ID information of the user as necessary information INF1.

When the recording medium 3 is a writable/readable IC card or memory card, information on the past job log of each user is saved as information INF2 necessary to display the user personal menu window. When the recording medium 3 is not any writable/readable medium, the information INF2 is saved in the memory 21 within the digital combined apparatus 10 or the memory 15a within the server 15.

Information INF3 on various job settings may be saved as an option in the recording medium 3.

User ID information and another information are transferred from the recording medium 3 to the digital combined apparatus main body 1. The controller 20 in the digital combined apparatus main body 1 recognizes the user ID information on the basis of the transferred information, and sets the user personal menu window on the operation panel 6, and loads and updates the job setting log. Of these pieces of information, necessary information such as data on the user personal menu window and the job setting log is transferred from the controller 20 to the memory 21 where the information is stored. Note that these pieces of information are not necessarily stored in the memory 21 within the digital combined apparatus 10. These pieces of information may be saved in the recording medium 3 of each user and loaded from the recording medium 3.

Information on the work setting log is supplied from the controller 20 to the recording medium 3 where the information is written.

When the recording medium 3 is an IC card or memory card, data can be written on the recording medium 3 by using the digital combined apparatus 10 or a user's client PC, PDA (Personal Digital Assistant), or the like. When the recording medium 3 is a magnetic card, a magnetic card reader/writer must be used. For a barcode-printed card, a barcode printing device must be used.

In the user personal menu window 9, an address book which is registered to a personal address book by a user and disclosed to the common address book can be used by another user.

The user personal menu window 9 can provide personal PC address books stored in the user's client PCs 11, 12, . . . which are connected via the network 14. The personal PC address books can be referred to, loaded into the digital combined apparatuses 10, 13, . . . , and printed out.

To realize this service, a common address book must be created and managed in a folder shared between the user's client PCs 11, 12, . . . which are connected via the network 14.

If the user selects "edit a personal address book" described above, he/she can edit the window. The editing results are saved in the memory 21 within each digital combined apparatus main body 1, or saved and integrally managed in the memory 15a of the server 15 connected to the digital combined apparatus 10 via the network 14.

When the editing results are integrally managed by the server 15, the user personal menu window 9 can also be used by other digital combined apparatuses 13, . . . connected via the network 14.

If the user selects "refer to previous work settings" described above, he/she can refer to previous work settings in the user personal menu window 9. Information on work settings is saved in the memory 21 within each digital combined apparatus main body 1, or saved and integrally managed in the memory 15a of the server 15 connected via the network 14.

When the work settings are integrally managed by the server 15, work settings performed in a plurality of digital combined apparatuses 10, 13, . . . which are connected via the network 14 are also managed. The use of previous work settings can increase the efficiency of performing the same work settings or similar work settings.

The user may be inhibited from using, e.g., various functions and addresses of the digital combined apparatus 10. In this case, information on available functions and unavailable functions is saved in the memory 21 within the digital combined apparatus main body 1, or saved and integrally managed in the memory 15a of the server 15 connected via the network.

According to the above-described embodiment, user ID information written on a recording medium is read by the reader/writer of the digital combined apparatus. This triggers automatic display of a user authentication window as a popup window which prompts the user to input a password. Only after the user inputs an authentic password, he/she can use the digital combined apparatus. As a result, the personal information, address book, and charging information of each user can be protected.

A file stored in a user's client PC which is connected to the digital combined apparatus via a network can be processed in the digital combined apparatus via the network, or used for processing such as printout or FAX transmission.

A personal PC address book managed in a client PC can be referred to on the screen of the digital combined apparatus 10, eliminating the need for any address input.

The above-described embodiment is merely an example, and does not limit the present invention. The present invention can be variously modified within the technical scope of the present invention.

What is claimed is:

1. A digital combined apparatus comprising:
   a card reader which reads data on a recording card medium which records at least user ID information;
   a memory which stores an authentic password and data for a user personal menu window customized for each user;
   an operation panel which displays a user authentication window which prompts the user to input a password for identifying the user when said card reader reads out ID information of a user from the recording card medium on which at least the ID information is recorded; and
   a controller which collates the password input on said operation panel in accordance with the user authentication window with the authentic password saved in said memory in advance, and if the input password is determined to be authentic, the digital combined apparatus can be operated, and said controller reads the data for the user personal menu window from the memory and displays the user personal menu window, which is customized based on a past operation log on said operation panel.

2. An apparatus according to claim 1, wherein said recording card medium is an IC card, magnetic card, memory card, barcode-printed card, or wireless unit card.

3. An apparatus according to claim 1, wherein said user personal menu window has a personal address book which records address information representing a transmission destination.

4. An apparatus according to claim 1, wherein a user is billed for various jobs executed by the user after the password is authenticated.

5. An apparatus according to claim 1, wherein, the past operation log is updated regarding an information on the past job log and is recorded in the memory.

6. A method of controlling a digital combined apparatus, comprising the steps of:
   reading out an ID information of a user from a recording card medium via a card reader which reads data on the recording card medium;
   displaying a user authentication window which prompts the user to input a password for identifying the user via an operation panel after reading out the ID information from the recording card medium;

collating the password input on said operation panel in accordance with the user authentication window with the authentic password saved in a memory in advance, and reading data for a user personal menu window customized for each user from the memory connected with the digital combined apparatus when the input password is determined to be authentic, and displaying the user personal menu window, which is customized based on a past operation log on said operation panel.

7. A method according to claim 6, wherein
said recording card medium is an IC card, magnetic card, memory card, barcode-printed card, or wireless unit card.

8. A method according to claim 6, wherein
said user personal menu window has a personal address book which records address information representing a transmission destination.

9. A method according to claim 6, wherein
a user is billed for various jobs executed by the user after the password is authenticated.

10. A method according to claim 6, wherein,
the past operation log is updated regarding an information on the past job log and is recorded in the memory.

11. A system, comprising:
a server and client personal computer connected to said digital combined apparatus via a network; and
a digital combined apparatus;
said digital combined apparatus having,
a card reader which reads data on a recording card medium which records at least user ID information,
a memory which stores an authentic password and data for a user personal menu window customized for each user,
an operation panel which displays a user authentication window which prompts the user to input a password for identifying the user when said card reader reads out ID information of a user from the recording card medium on which at least the ID information is recorded, and
a controller which collates the password input on said operation panel in accordance with the user authentication window with the authentic password saved in said memory in advance, and if the input password is determined to be authentic, the digital combined apparatus can be operated, and said controller reads the data for the user personal menu window from the memory and displays the user personal menu window, which is customized based on a past operation log on said operation panel.

12. A system according to claim 11, wherein
said recording card medium is an IC card, magnetic card, memory card, barcode-printed card, or wireless unit card.

13. A system according to claim 11, wherein
said user personal menu window has a personal address book which records address information representing a transmission destination.

14. A system according to claim 11, wherein
a user is billed for various jobs executed by the user after the password is authenticated.

15. A system according to claim 11, wherein,
the past operation log is updated regarding an information on the past job log and is recorded in the memory.

16. An apparatus according to claim 1, wherein the user personal menu window includes each of: a) indicia of editing a personal address book for saving or deleting the personal address book, b) referring to a common address book for selecting whether or not to disclose the personal address book to the common address book, referring to a personal computer address book for referring to an address book in a client computer, c) loading a print job for loading data on a print job set in advance, d) editing and saving a user personal menu window for editing or saving the user personal menu window, and e) referring to previous work settings for reading out and referring to the previous work settings.

17. A system according to claim 11, wherein the user personal menu window includes each of: a) indicia of editing a personal address book for saving or deleting the personal address book, b) referring to a common address book for selecting whether or not to disclose the personal address book to the common address book, c) referring to a personal computer address book for referring to an address book in a client computer, d) loading a print job for loading data on a print job set in advance, e) editing and saving a user personal menu window for editing or saving the user personal menu window, and f) referring to previous work settings for reading out and referring to the previous work settings.

* * * * *